United States Patent
L'Heureux et al.

(10) Patent No.: US 8,621,036 B1
(45) Date of Patent: Dec. 31, 2013

(54) SECURE FILE ACCESS USING A FILE ACCESS SERVER

(76) Inventors: Israel L'Heureux, Monaco (MC); Mark D. Alleman, Portland, OR (US)

(*) Notice: Subject to any disclaimer, the term of this patent is extended or adjusted under 35 U.S.C. 154(b) by 267 days.

(21) Appl. No.: 12/948,666

(22) Filed: Nov. 17, 2010

(51) Int. Cl.
| G06F 15/16 | (2006.01) |
| G06F 7/04 | (2006.01) |
| G06F 17/30 | (2006.01) |
| H04N 7/16 | (2011.01) |
| H04L 29/06 | (2006.01) |

(52) U.S. Cl.
USPC .............. 709/217; 726/27; 726/28; 726/30; 713/165

(58) Field of Classification Search
USPC .............. 713/165; 709/217, 219, 226, 225; 726/27, 28, 30
See application file for complete search history.

(56) References Cited

U.S. PATENT DOCUMENTS

| 5,748,735 A * | 5/1998 | Ganesan | 713/165 |
| 6,816,970 B2 * | 11/2004 | Morgan et al. | 713/183 |
| 7,043,637 B2 * | 5/2006 | Bolosky et al. | 713/171 |
| 7,299,357 B2 * | 11/2007 | Karamchedu et al. | 713/171 |
| 7,380,120 B1 * | 5/2008 | Garcia | 713/160 |
| 7,665,081 B1 * | 2/2010 | Pavlyushchik | 717/168 |
| 7,711,122 B2 * | 5/2010 | Allen et al. | 380/286 |
| 7,921,284 B1 * | 4/2011 | Kinghorn et al. | 713/160 |
| 2005/0188199 A1 * | 8/2005 | Smith et al. | 713/165 |
| 2008/0123858 A1 * | 5/2008 | Perlman et al. | 380/278 |
| 2010/0146269 A1 * | 6/2010 | Baskaran | 713/165 |

* cited by examiner

*Primary Examiner* — John Follansbee
*Assistant Examiner* — Madhu Woolcock
(74) *Attorney, Agent, or Firm* — Michael J. Andri

(57) ABSTRACT

A secure file access system and method are disclosed which comprises a file access module executed on a processor of a computing device. The file access module receives a request to access an encrypted file from a computer program executed on the computing device and sends an access query including an encrypted first segment of the encrypted file and a user identifier to a file access server via a communication network. The access query enables the file access server, after decryption of the encrypted first segment using a first decryption key, to authorize or deny access to the encrypted second segment based, at least in part, on the user identifier and file access permission data. The file access module decrypts the encrypted second segment using a second decryption key obtained from the file access server to enable the computer program to access the second segment of the file.

15 Claims, 4 Drawing Sheets

SECURE FILE ACCESS USING A FILE ACCESS SERVER

BACKGROUND

Computing devices and associated computing networks enable users to create, share, and modify electronic files, which are stored on file systems. Access control mechanisms have been implemented to control access to these file systems by certain users or groups of users. These prior access control systems control access of each user to locations, such as volumes or folders, on the file system. In this way, the access control system may prevent an unauthorized user from opening a file that is stored in a location that the user is not authorized to access. One drawback with such an approach is that a file is only protected from unauthorized access so long as it remains in the secure location on the file system. Once the file is copied and moved out of the secure location, for example, if the file is sent as an attachment to an email or saved to a universal serial bus (USB) drive, the security protections are lost and anyone with access to the email or USB drive can open the file. For this reason, some files may be encrypted, however, encryption keys are difficult to manage, particularly when the encrypted data is sent outside an organization for receipt by a third party. As a result, many sensitive files are sent out of organizations in unencrypted form, exposing them to a risk of unauthorized access.

SUMMARY

Implementations for secure file access are disclosed. In at least one implementation, a secure file access system is disclosed which comprises a file access module executed on a processor of a computing device. The file access module is configured to receive a request to access an encrypted file from a computer program executed on the computing device. The encrypted file includes an encrypted first segment and an encrypted second segment. The encrypted first segment has a different decryption key than the encrypted second segment. The encrypted first segment includes or indicates file access permission data.

The file access module is also configured to send an access query including the encrypted first segment and a user identifier to a file access server via a communication network. The access query enables the file access server, after decryption of the encrypted first segment using a first decryption key, to authorize or deny access by the computer program to the encrypted second segment based, at least in part, on the user identifier and the file access permission data.

The file access module is also configured to receive an access reply from the file access server. The access reply includes key information for decrypting the encrypted second segment only if the file access server has authorized access to the encrypted second segment. The key information includes a second decryption key for decrypting the encrypted second segment or for enabling the computing device to generate or access the second decryption key for decrypting the encrypted second segment.

The file access module is also configured decrypt the encrypted second segment using the second decryption key to enable the computer program to access the second segment of the file. Claimed subject matter, however, is not limited by this summary as other implementations are disclosed by the following written description and associated drawings.

DETAILED DESCRIPTION

Figure 1:
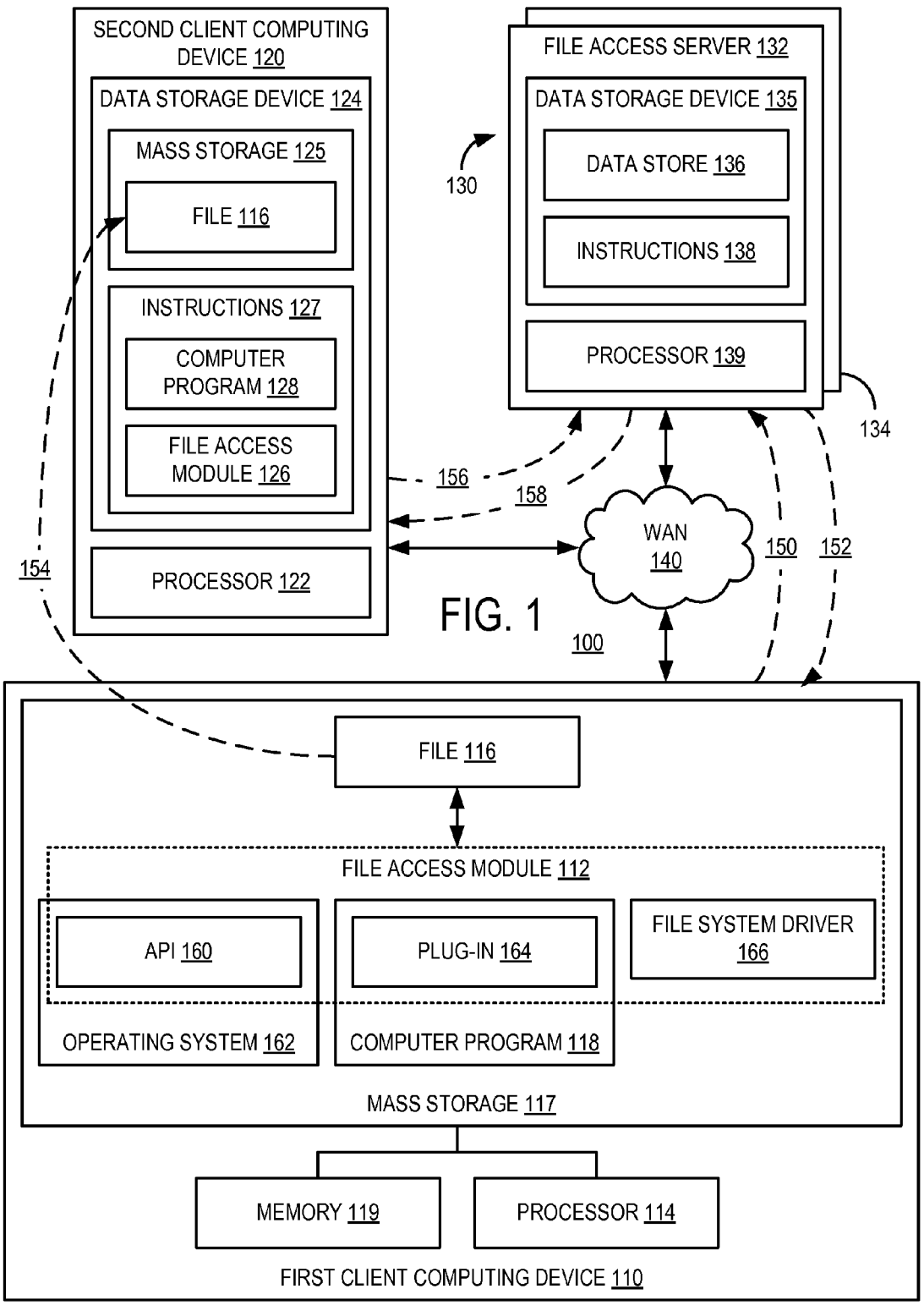
FIG. 1 is a schematic diagram depicting an example secure file access system according to at least one implementation.

FIG. 1 is a schematic diagram depicting an example secure file access system 100 according to at least one implementation. Secure file access system 100 includes one or more client computing devices such as first client computing device 110 and second client computing device 120. Secure file access system 100 further includes a server system 130 comprising file access server 132. Server system 130 may include any suitable number or configuration of servers in addition to file access server 132. For example, server system 130 may further comprise server 134. First client computing device 110 and second client computing device may communicate with each other and server system 130, including file access server 132 via a communication network such as wide area network (WAN) 140.

First client computing device 110, second client computing device 120, file access server 132, and server 134 may each comprise a processor and a data storage device having instructions stored thereon executable by the processor to perform one or more processes. A processor, such as example processor 114, comprises hardware to execute computer programs or other suitable instructions. A data storage device may refer to memory, mass storage, removable storage media, or a combination thereof. As one example, a file access module 112 may be executed on or by processor 114 of first client computing device 110 by loading file access module 112 from mass storage 117 or removable storage media to memory 119. In at least some implementations, the instructions described herein, such as example file access module 112 or instructions 138, may be stored on and distributed via removable storage media. Removable storage media, such as a CD-ROM, DVD, a USB flash drive, magnetic disk, etc. may provide non-transitory storage of information.

Figure 2:
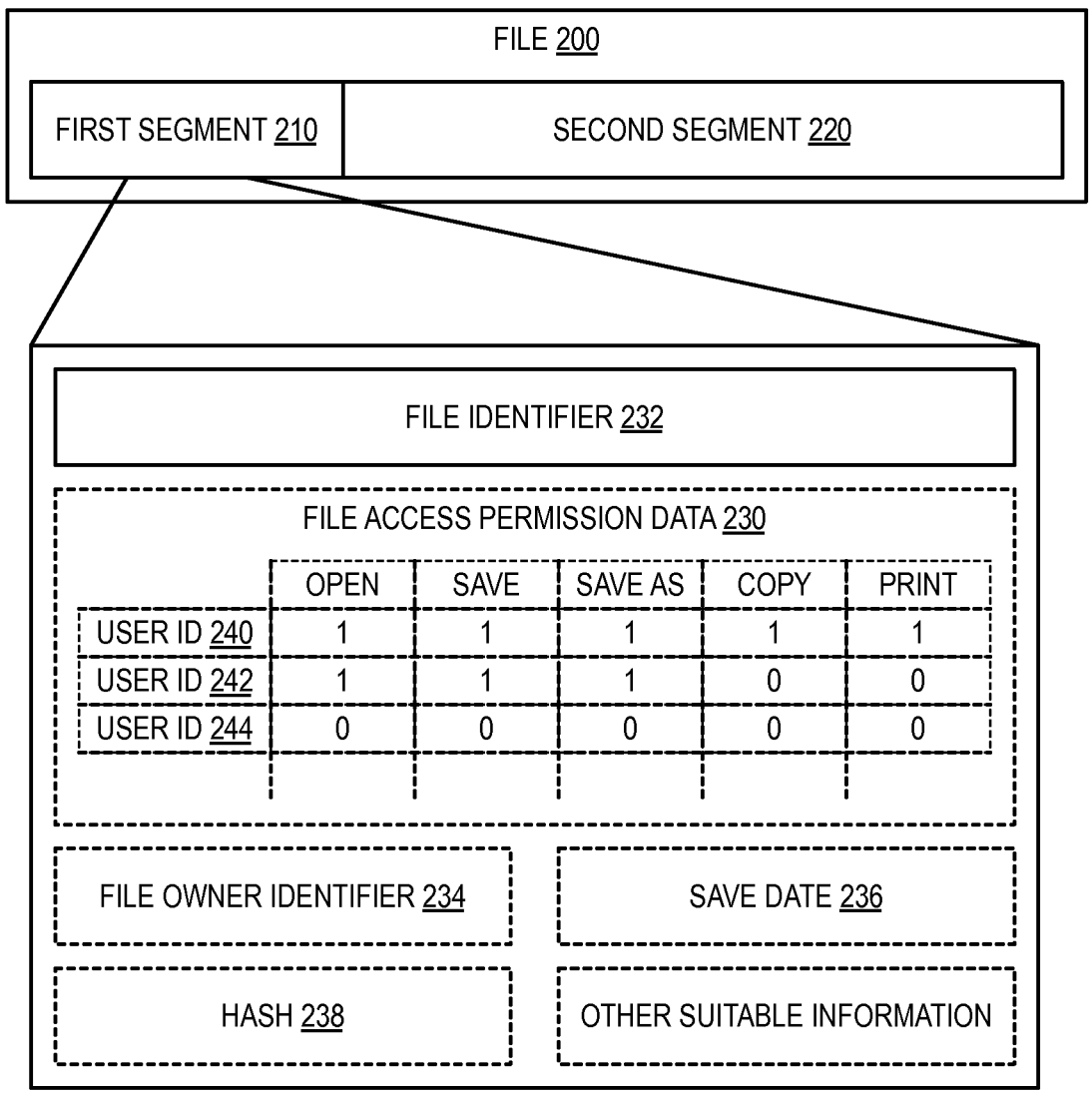
FIG. 2 is a schematic diagram of an example file according to at least one implementation.

File access module 112 is configured to receive a request to access an encrypted file 116 from a computer program 118 executed on first client computing device 110. Computer program 118 may comprise any suitable type of computer program such as, for example, a file viewer application (e.g., a media player application) or a file creation application (e.g., word processing application). File 116 may be stored on a local data store such as mass storage 117 and/or may be stored at a remote data store such as data store 136. In at least some implementations, encrypted file 116 includes an encrypted first segment and an encrypted second segment as depicted in FIG. 2. The encrypted first segment may have a different decryption key than the encrypted second segment. The encrypted first segment may include or indicate file access permission data.

File access module 112 is configured to send an access query 150 including the encrypted first segment and a user identifier to file access server 132 via a communication network such as WAN 140. In at least some implementations, a user identifier may include user credentials such as one or more of a username, a password, a hash of a username, a hash of a password, a digital certificate, or other suitable authentication information. As one example, authentication may be performed locally by file access module 112 or operating system 162 by prompting a user for a username, password, or other authentication information. As yet another example, authentication may be performed remotely by file access server 132 or other server (e.g., server 134) based on authentication information (e.g., username, password, or hash thereof) transmitted by first client computing device 110 via WAN 140.

Access query 150 enables file access server 132, after decryption of the encrypted first segment using a first decryption key, to authorize or deny access by computer program 118 to the encrypted second segment based, at least in part, on the user identifier and the file access permission data. The first decryption key may be known to file access server 132. Access query 150 may be communicated as one or more discrete messages. In at least some implementations, access query 150 may be encrypted and communicated from file access module 112 to file access server 132 using transport layer security (TLS) or secure sockets layer (SSL) cryptographic protocols.

Data storage device 135 of file access server 132 may have instructions 138 stored thereon executable by processor 139 to process access queries received from client computing devices. File access server 132 is configured to receive access query 150 and return an access reply 152. File access module 112 is configured to receive access reply 152 from file access server 132. Access reply 152 may be communicated as one or more discrete messages. In at least some implementations, access reply 152 may be encrypted and communicated from file access server 132 to file access module 112 using transport layer security (TLS), secure sockets layer (SSL), or other suitable cryptographic protocol.

Access reply 152 may include key information for decrypting the encrypted second segment only if the file access server has authorized access by computer program 118 to the encrypted second segment. If file access server 132 has not authorized access to the encrypted second segment, access reply 152 does not include the key information for decrypting the encrypted second segment or access reply 152 may not be returned by file access server 132. Accordingly, computer program 118 may access file 116 only if access is authorized by file access server 132.

In at least some implementations, the key information of access reply 152 includes a second decryption key for decrypting the encrypted second segment. Alternatively, the key information may enable file access module 112 to generate or access the second decryption key for decrypting the encrypted second segment. For example, the key information may indicate an identity of a shared secret from which the second decryption key may be generated by file access module 112. As another example, the key information may indicate a network resource (e.g., server 134) from which file access module 112 may request and receive the second decryption key.

In at least some implementations, the second decryption key for decrypting the encrypted second segment is generated at the computing device based, at least in part, on the key information. However, in at least some implementations, the second decryption key for decrypting the encrypted second segment is generated at file access server 132 and communicated to file access module 112. In at least some implementations, the second decryption key for decrypting the encrypted second segment is unique to the user identifier and/or to the file. However, in at least some implementations, a second decryption key for decrypting the encrypted second segment may be used for a plurality of user identifiers and/or files.

File access module 112 is configured to decrypt the encrypted second segment using the second decryption key to enable computer program 118 to access the second segment of file 116. In at least some implementations, the file access permission data indicates whether a user indicated by the user identifier may perform (e.g., via computer program 118) each designated action of a set of one or more designated actions on the file. The set of one or more designated actions may include, for example, one or more of an open action, a save action, a save as action, a copy action, a print action. However, the set of one or more designated actions may include any suitable type or number of actions. Access query 150 may further indicate a requested designated action to be performed on the file. Access reply 152 may indicate whether the requested designated action is authorized to be performed.

A file such as file 116 may be stored at a remote data store such as data store 136 residing at data storage device 135 of file access server 132. The remote data store may alternatively or additionally reside at server 134. In at least some implementations, file access server 132 is configured to enforce versioning control by checking incoming access queries for access to respective versions of the file. The versions of the file may be identified by file access server 132 from one or more of a save date of the file or a hash of at least a portion of the file. File access server 132 may check respective versions of the file against a latest version of the file stored at remote data store 136 or server 134 to determine whether a given access query is requesting the latest version of the file. If the latest version of the file is not being requested, file access server 132 may be configured to serve the latest version of the file to the requesting computing device if access is to be granted, instead of granting access to an out-of-date version of the file.

File access module 112 may be implemented in a number of ways. For example, file access module 112 may constitute an application programming interface 160 of an operating system 162, a plug-in module 164 for a computer program such as computer program 118, an executable computer program such as computer program 118, or a file system driver 166.

File access module 112 may be configured to generate a file. For example, in at least some implementations, prior to authorizing access to file 116, file access module 112 or another file access module residing at another computing device may generate file 116 including the first segment and the second segment. The file access module is configured to encrypt the first segment of the file with a first encryption key to obtain the encrypted first segment. The first encryption key may be generated by file access module 112 locally at the client computing device or may be requested and received from file access server 132.

File access module 112 may be configured to request and receive a second encryption key from file access server 132. However, in at least some implementations, the second encryption key may be generated locally at first client computing device 110, for example, by file access module 112. File access module 112 may be configured to encrypt the second segment of the file with the second encryption key to obtain the encrypted second segment. File access module 112 may be configured to save the encrypted first segment and the encrypted second segment on a local data store such as mass storage 117 and/or at a remote data store such as remote data store 136.

The file generation and file access processes described above may be performed across multiple computing devices. For example, first client computing device 110 including processor 114 and mass storage 117 having a first instruction set (e.g., file access module 112) stored thereon that may be executed by processor 114 to: (1) generate a file including a first segment that includes or indicates file access permission data and a second segment that comprises any suitable information for which access is to be controlled; (2) encrypt the file to obtain an encrypted first segment and an encrypted second segment such that the encrypted first segment has a different decryption key than the encrypted second segment. Encrypted file 116 may be transmitted or otherwise transferred to second client computing device 120 as indicated at 154, where encrypted file 116 may be stored in mass storage 125, for example.

Second client computing device 120 may include another processor 122 and another data storage device 124 having a second instruction set (e.g., file access module 126) stored thereon that may be executed by processor 122. File access module 126 may be functionally identical to previously described file access module 112. Accordingly, file access module 126 may be configured to: (1) obtain encrypted file 116; (2) in response to a request from a computer program 128 of instructions 127 to access encrypted file 116, send an access query 156 including the encrypted first segment of the encrypted file and a user identifier for a user of second client computing device 120 to file access server 132 via a communication network such as WAN 140; (3) receive an access reply 158 from file access server 132 that includes key information for decrypting the encrypted second segment only if the file access server has authorized access to the encrypted second segment; and (4) decrypt the encrypted second segment of file 116 using the second decryption key to enable access to the second segment of file 116 by computer program 128.

FIG. 2 is a schematic diagram of an example file 200 according to at least one implementation. File 200 may correspond to previously described file 116 of FIG. 1, for example. File 200 includes first segment 210 and second segment 220. In at least some implementations, first segment 210 may comprise a predetermined number of bytes (e.g., 1024 bytes) of information. As one example, first segment 210 may be offset by a predetermined number of bytes from the start or end of file 200.

First segment 210 may include or indicate one or more of file access permission data 230, file identifier 232, file owner data 234, save date 236, or hash 238. As one example, first segment 210 may include file identifier 232 to indicate file access permission data 230 without file access permission data 230 being present in first segment 210. A file access server may, for example, retrieve file permission data 230 from a data store based on the file identifier 232. File identifier 232 may comprise a globally unique identifier (GUID) in at least some implementations. Accordingly, file access permission data 230, file owner data 234, save date 236, or hash 238 may be omitted from first segment 210 in some examples.

As another example, first segment 210 includes some or all of file access permission data 230, file identifier 232, file owner data 234, save date 236, hash 238, or other suitable information. Hash 238 may comprise a hash of at least a portion of file 200 and may be used by a file access server, for example, to determine the integrity of an access query.

In at least some implementations, second segment 220 comprises a payload segment of the file which may include information to which access is to be controlled. Accordingly, second segment 220 may include any form of information such as, for example, a text document, a presentation document, a spreadsheet document, an image file, a video file, an audio file, a computer program or portion thereof, or other suitable information.

FIG. 2 further depicts file access permission data 230 including one or more user identifiers such as USER ID 240, USER ID 242, and USER ID 244, and a set of one or more designated actions such as OPEN, SAVE, SAVE AS, COPY, and PRINT. File access permission data 230 may be defined, for example, by a file owner indicated by the file owner identifier or by a system administrator. File access permission data 230 is depicted in FIG. 2 as a data table, whereby a "1" refers to an access flag for enabling access by a particular user indicated by a user identifier to a particular designated action, and a "0" refers to the absence of the access flag. Referring to the example data table, a user indicated by USER ID 240 may be granted access to designated actions OPEN, SAVE, SAVE AS, COPY, and PRINT. By contrast, a user indicated by USER ID 242 may be granted access to designated actions OPEN, SAVE, and SAVE AS, but may not be granted access to designated actions COPY and PRINT. A user indicated by USER ID 244 may not be granted access to designated actions OPEN, SAVE, SAVE AS, COPY, or PRINT. Updates to file access permission data may be reflected as an addition or removal of one or more access flags to or from the file access permission data, for example. In at least some implementations, a plurality of user identifiers may be associated with one or more classes of users, and file permission data 230 may indicate designated actions for the one or more classes of users.

Figure 3:
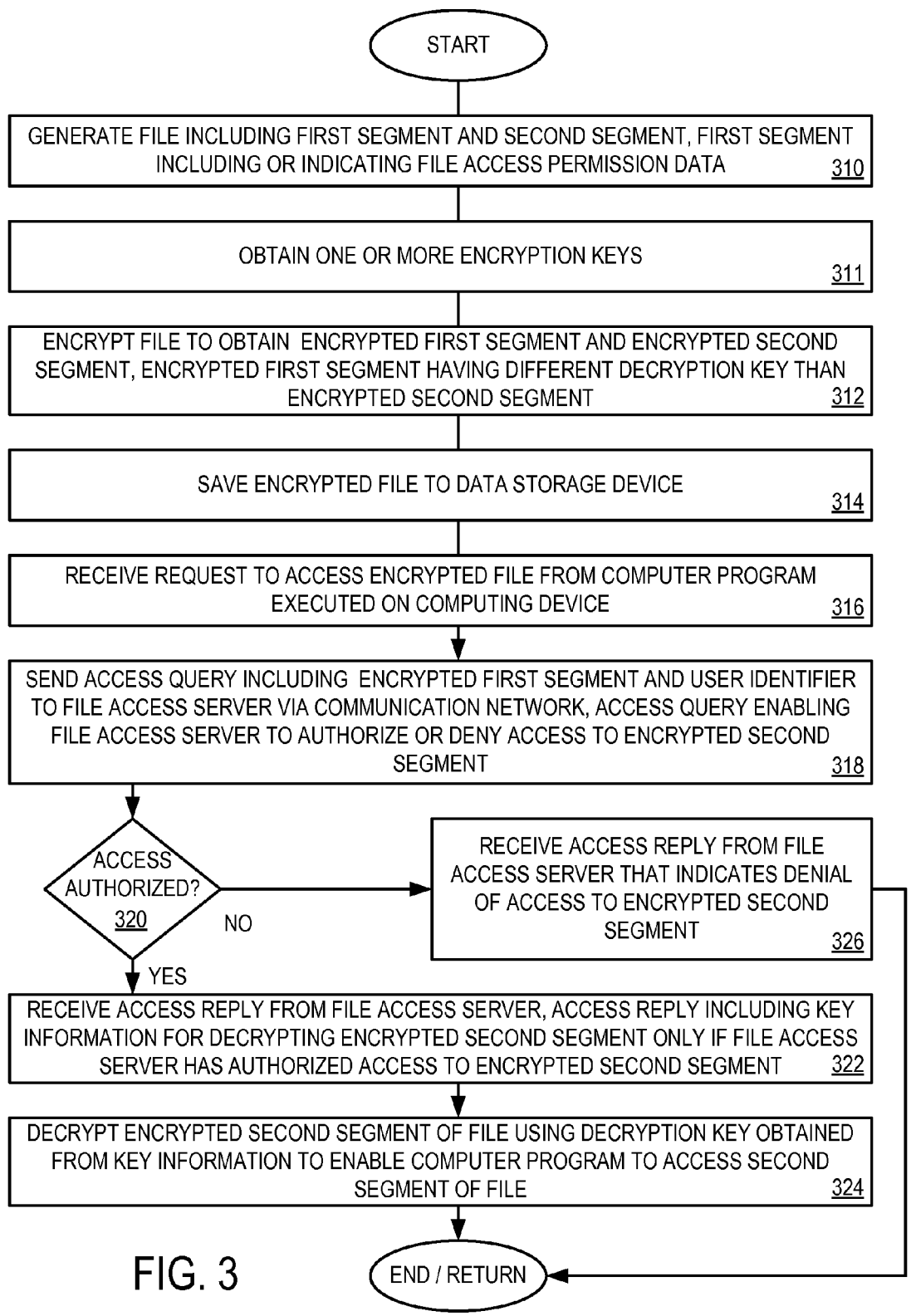
FIG. 3 is a process flow diagram depicting an example method for controlling access to a file by a computing device according to at least one implementation.

FIG. 3 is a process flow diagram depicting an example method 300 for controlling access to a file by a computing device according to at least one implementation. As one example, method 300 may be performed by previously described file access module 112 and/or file access module 126 of FIG. 1.

Operation 310 comprises generating a file including a first segment and a second segment. The first segment may include or indicate file access permission data, for example, as previously described with reference to FIG. 2. Operation 311 comprises obtaining one or more encryption keys for encrypting the file.

Operation 312 comprises encrypting the file to obtain an encrypted first segment and an encrypted second segment. The encrypted first segment may have a different decryption key than the encrypted second segment. For example, the first segment may be encrypted using a first encryption key to obtain the encrypted first segment. The second segment may be encrypted with a second encryption key to obtain the encrypted second segment.

Operation 314 comprises saving the encrypted file to a data storage device. In at least some implementations, the encrypted file may be saved as a file having a ".ss" file extension. However, other suitable file extensions may be utilized to indicate that the file is encrypted. The encrypted file may be stored locally at a computing device in mass storage and/or may be transmitted to a remote data store for storage.

In some scenarios, the encrypted file may be transmitted or otherwise transferred from a first computing device to a second computing device. The encrypted file may be obtained by the second computing device from the first computing device via an email, a shared volume or data storage device, a portable drive or removable storage media such as a USB flash drive, a remote data store accessible via a communication network, or other suitable method. In scenarios where the encrypted file is transmitted or otherwise transferred to another computing device, operations 310, 312, and 314 may be performed by a first computing device and operations 316-326 may be performed by a second computing device. However, in other scenarios, operations 310-326 may be performed by an individual computing device.

Operation 316 comprises receiving a request to access the encrypted file from a computer program executed on a computing device. The request to access the encrypted file may be generated by the computer program in response to a user selecting or requesting a particular action or operation to be performed by the computer program with respect to the encrypted file. For example, the request may indicate a desired action, such as one or more of an open action, a save action, a save as action, a copy action, or a print action. Other suitable actions or operations may be requested beyond the examples described herein.

Operation 318 comprises sending an access query including the encrypted first segment and a user identifier to a file access server via a communication network. The user identifier may comprise user credentials or an indication of authentication of the user credentials, for example. Operation 318 may be performed in response to receiving the request to access the encrypted file at operation 316. In at least some implementations, the access query may further indicate an action that is requested by the computer program or by a user via the computer program, such as one or more of an open action, a save action, a save as action, a copy action, or a print action, for example.

The file access server receives the access query including the encrypted first segment and use identifier via the communication network. The access query enables the file access server to decrypt the encrypted first segment using a first decryption key, and to authorize or deny access to the encrypted second segment based, at least in part, on the user identifier and the file access permission data of or indicated by the first segment. As one example, the first segment may include the file access permission data. As another example, the first segment may include a file identifier that is associated with and indicates a location (e.g., a data store) where the file access server may obtain the file access permission data.

If the access query indicates an action that is requested by the computer program, the file access server may authorize or deny access to the encrypted second segment further based on the action indicated by the access query. As one example, the file access query may compare the requested action, user identifier, and file identifier to the file permission data to identify whether a user identified by the user identifier may access the file indicated by the file identifier in a manner that is consistent with the requested action. For example, the file access permission data may indicate whether a user indicated by the user identifier is authorized to access the encrypted second segment of the file.

In at least some implementations, the first decryption key may be identical to the first encryption key used to encrypt the first segment of the file. However, in at least some implementations, the first decryption key may be different than the first encryption key used to encrypt the first segment of the file. For example, the first encryption key may comprise a private key that is unknown to the client computing device.

The file access server is configured to process the access query and return an access reply to the computing device that initiated the access query. If access is authorized at operation 320, the process flow of method 300 may proceed to operation 322. Operation 322 comprises receiving an access reply from the file access server. The access reply includes key information for decrypting the encrypted second segment only if the file access server has authorized access to the encrypted second segment. The key information includes a second decryption key for decrypting the encrypted second segment or enables the second computing device to generate or access the second key. Operation 324 comprises decrypting the encrypted second segment of the file using the second decryption key to enable access to the second segment of the file. In at least some implementations, the second decryption key may be identical to the second encryption key used to encrypt the second segment of the file. However, in at least some implementations, the second decryption key may be different than the second encryption key used to encrypt the second segment of the file.

In at least some implementations, the file access permission data may indicate whether a user indicated by the user identifier may perform each designated action of a set of one or more designated actions on the file. As previously described, the set of one or more designated actions may include, for example, one or more of an open action, a save action, a save as action, a copy action, a print action. The access query may further indicate a requested designated action to be performed on the file. The access reply may indicate whether the requested designated action indicated by the access query is authorized to be performed. If, for example, a requested designated action is not authorized to be performed, the file access server may withhold the second decryption key from the requesting computing device to deny the requested access.

Alternatively, the process flow of method 300 may proceed to operation 326 if access has not been authorized by the file access server. Operation 326 comprises receiving an access reply from the file access server that indicates denial of access to the encrypted second segment. The access reply received at operation 326 does not include the second decryption key, for example. In at least some implementations, an access reply may not be sent by the file access server if access is not granted.

Figure 4:
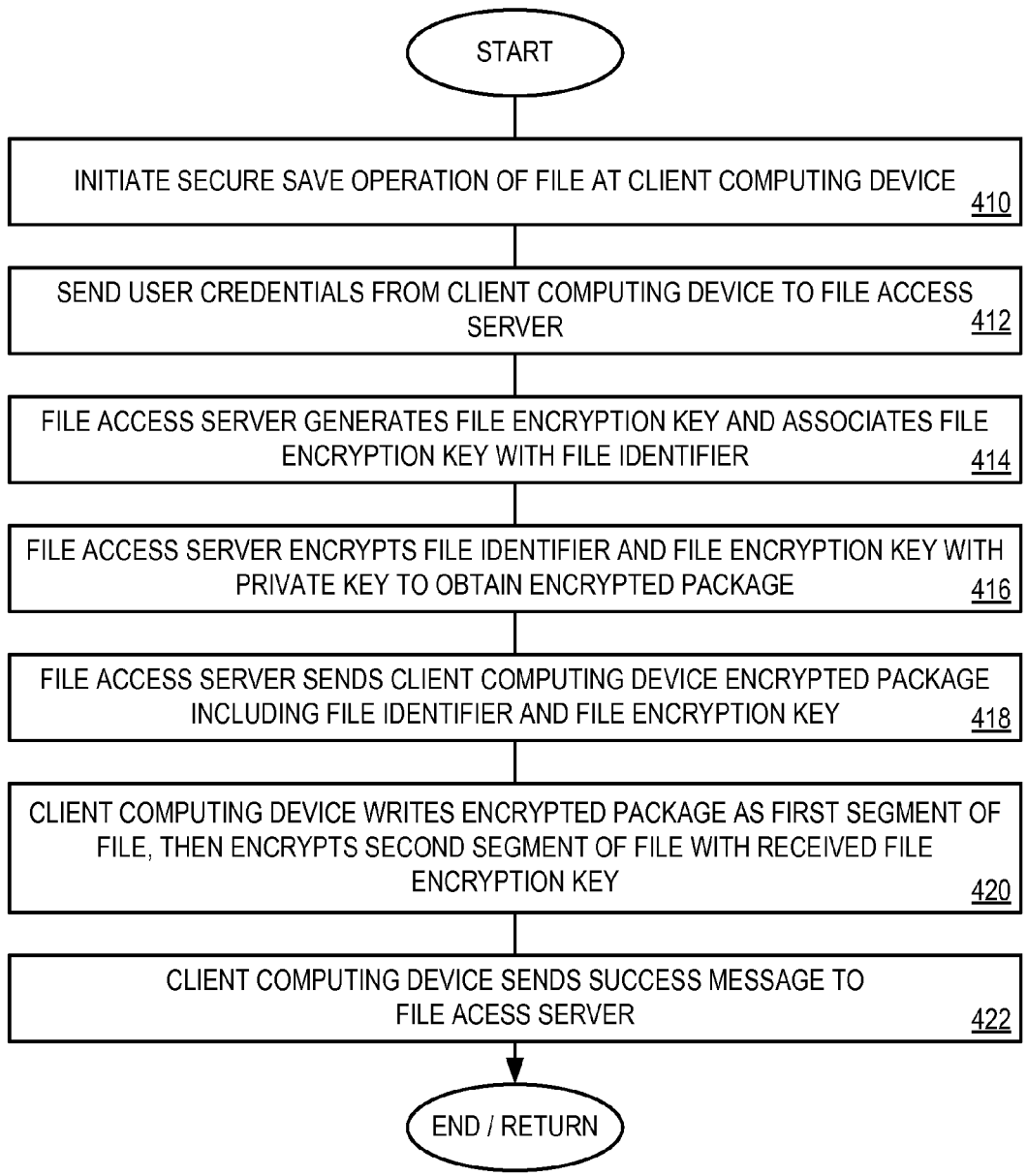
FIG. 4 is a process flow diagram depicting an example method for generating and encrypting a file according to at least one implementation.

FIG. 4 is a process flow diagram depicting an example method 400 for generating and encrypting a file according to at least one implementation. As one example, method 400 depicts an example secure save operation that may be initiated by a user. Method 400 describes one way of implementing operations 310, 311, and 312 of method 300. Operation 410 comprises initiating a secure save operation of a file at a client computing device. In at least some implementations, a user may select a secure save option, for example, via a file access module to initiate a secure save operation. A user that initiates the secure save operation for a file may be referred to as the file owner and may be identified by a file owner identifier. A file owner may define or change file access permission data associated with a file.

Operation 412 comprises sending user credentials from the client computing device to a file access server. As one example, the file access module may send user credentials for a user to the file access server in response to the user initiating the secure save operation. User credentials are one example of a user identifier that may be sent to the file access server. User credentials may include any suitable authentication format such as a username and password, digital certificate, etc. Alternatively, an indication that user credentials have been authenticated by the file access module may be sent by the file access module to the file access server. In at least some implementations, operation 412 additionally may include sending a file identifier to the file access server with the user credentials or indication that user credentials have been authenticated. The file identifier may comprise a globally unique identifier (GUID) in at least some implementations.

Operation 412 may be utilized, for example, to generate an encrypted file via a secure save operation. For an existing encrypted file that was previously saved, an access request may be utilized to obtain an encryption key for decrypting the encrypted file as previously described with reference to Operations 316-326 of FIG. 3, for example.

The file access server may receive the user credentials or indication of authentication, and optionally a file identifier. Operation 414 comprises creating a file identifier and a file encryption key at a file access server. In at least some implementation, if a file identifier has been sent to the file access server by the client computing device, the file access server may utilize the file identifier received from the client computing device. A file identifier created by the file access server may comprise a GUID in at least some implementations. Operation 414 may be performed by the file access server in response to obtaining a request for the file encryption key from the client computing device. File access server may associate the file encryption key with the file identifier, for example, at the data storage device of the file access server.

Operation 416 comprises encrypting the file identifier and file encryption key with a private key at the file access server to obtain an encrypted package. The private key may be known only to the file access server and may be unknown by the client computing device. Operation 418 comprises sending the encrypted package including the file identifier and the file encryption key from the file access server to the client computing device.

The client computing device may receive the encrypted package. Operation 420 comprises, at the client computing device, writing the encrypted package as a first segment of the file, and then encrypting a second segment of the file with the file encryption key received from the file access server. In this way, the first segment of the file may be encrypted with a private key that is unknown to the client computing device and the second segment of the file may be encrypted with the file encryption key that is different from the private key.

Operation 422 comprises, sending a success message from the client computing device to the file access server. In at least some implementations, a client computing device sends a success message to the file access server in response to successfully generating a file having a first encrypted segment and a second encrypted segment utilizing the process flow of operations 410-420, for example. The file access server may receive the success message from the client computing device, and may store the success message in a data store in association with the file identifier, for example.

The above embodiments enable secure access to encrypted files in a way that does generally not depend on controlling access to the storage location at which the file is saved. This has the advantage of preserving the access controls on the file even when the file leaves an environment in which traditional storage-location based access controls are in place, such as when a file is emailed or copied to a USB drive.

The system may be equipped with a reporting module at the file access server configured to keep access statistics of all of the files managed by the file access server. The reporting module may be configured to record which users access the files, and the time of each access. The file access module may also be configured to collect statistics at each client computing device regarding the individual actions requested by users for each file, including open, close, print, save, save as, copy and paste commands, the full path name at which the file is stored on the local client device, etc.

From time to time, an administrator or other user with sufficient access privileges (e.g., file owner) may deauthorize a user from accessing a file or files. At the time of deauthorization, the file access server may be configured to send a command to the file access module to cause any open documents for which a user has been deauthorized to be forced closed, and further access prevented. This can prevent users from foiling the access controls described herein by keeping documents open on their local client devices.

While generally encrypted data is not searchable, the systems described herein may include search algorithms that enable searching of an encrypted file. One manner in which the file access module may accomplish this is by receiving search queries from users including keywords to be searched over one or more encrypted files, and passing those search queries to the file access server. The file access server in turn may perform a protected search remotely, and return results in the form of a list of links to files containing the search terms, for example, to the requesting file access module, for display to the user. The user would have to be authorized to access a file in order to traverse the links and open the files. Alternatively, the file access module may host a local protected database in which the protected search may be conducted, and the search results file list may be generated locally.

The system may also be configured to execute versioning control over the files under its management. For example, when two users each have a locally stored encrypted copy of a file with the same GUID, and each user has access to change their version of the file, the file access server may receive save requests from the respective file access modules on each user's machine, and the file access server may intelligently create two different versions of the file and assign modified GUIDs to each version. The file access server may then send a message to each other concurrently editing user that edits have been made by another user, and ask each user whether to display, and ultimately harmonize the changes made by each other user into a current version incorporating all edits. In this manner users with access privileges may in certain circumstances harmonize all changes into a single up-to-date file, and in other circumstances work in parallel on different versions, without attempting to harmonize.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A secure file access system, comprising:
a processor of a computing device;
a file access module, executing on the processor of the computing device, configured to:
  receive a request, from a computer program executing on the computing device, to access an encrypted file, the encrypted file including an encrypted first segment and an encrypted second segment, the encrypted first segment having a different decryption key than the encrypted second segment, the encrypted first segment including or indicating file access permission data, a save date for the file, a file identifier, and a hash of at least a portion of the file;
  send an access query indicating a requested designated action to be performed on the file and including the encrypted first segment and a user identifier to a file access server via a communication network, the hash for use by the file access server to determine integrity of the access query, and the access query enabling the file access server, after decryption of the encrypted first segment using a first decryption key, to authorize or deny access to the encrypted second segment based, at least in part, on the user identifier, the hash, the file identifier, and the file access permission data, the file access permission data indicating whether a user indicated by the user identifier may perform each designated action of a set of one or more designated actions, including the requested designated action, on the file;

receive an access reply from the file access server, the access reply indicating whether access to the encrypted second segment including the requested designated action is authorized and including key information for decrypting the encrypted second segment only if the file access server has authorized access, the key information including a second decryption key for decrypting the encrypted second segment or information enabling a second computing device to generate or access the second decryption key for decrypting the encrypted second segment;

if access to the encrypted second segment is authorized, receive a latest version of the file at the file access module if the access query did not request the latest version of the file by way of the access server enforcing versioning control by checking a version of the file stored at a remote data store identified by the access query based on the save date and the hash and by checking the version against a latest version of the file stored at the remote data store to determine whether the access query requested the latest version of the file, and if the access query did not request the latest version of the file, then the file access server serving the latest version of the file to the computing device; and decrypt the encrypted second segment of the file or the latest version of the file using the second decryption key to enable the computer program to access the second segment of the file or the latest version of the file in accordance with the requested designated action.

2. The system of claim 1, wherein the set of one or more designated actions includes one or more of an open action, a save action, a save as action, a copy action, a print action.

3. The system of claim 1, wherein the second decryption key for decrypting the encrypted second segment is generated at the computing device based, at least in part, on the key information.

4. The system of claim 1, wherein the second decryption key for decrypting the encrypted second segment is generated at the file access server.

5. The system of claim 1, wherein the second decryption key for decrypting the encrypted second segment is unique to the user identifier and/or to the file.

6. The system of claim 1, wherein the file is stored on a local data store at the computing device and/or on a remote data store at the file access server.

7. The system of claim 1, wherein the file access module is an application programming interface, a plug-in module for a computer program, an executable computer program, or a file system driver.

8. The system of claim 1, wherein, prior to authorizing access to the file, the file access module is configured to:

generate the file including the first segment and the second segment;

encrypt the first segment of the file with a first encryption key to obtain the encrypted first segment, the first encryption key being generated by the file access module locally at the computing device or being requested and received from the file access server;

request and receive a second encryption key from the file access server;

encrypt the second segment of the file with the second encryption key to obtain the encrypted second segment; and save the encrypted first segment and the encrypted second segment on a local data store and/or a remote data store.

9. A method of controlling access to a file by a computing device, comprising:

generating a file including a first segment and a second segment, the first segment including or indicating file access permission data, a save date for the file, a file identifier, and a hash of at least a portion of the file, the file access permission data indicating whether a user indicated by a user identifier may perform each designated action of a set of one or more designated actions on the file;

encrypting the file to obtain an encrypted first segment from the first segment and an encrypted second segment from the second segment, the encrypted first segment having a different decryption key than the encrypted second segment;

saving the encrypted file to a data storage device;

in response to a request to access the encrypted file, sending an access query indicating a requested designated action of the set of one or more designated actions to be performed on the file and including the encrypted first segment and a user identifier to a file access server via a communication network, the hash for use by the file access server to determine integrity of the access query, and the access query enabling the file access server to decrypt the encrypted first segment with a first decryption key and to authorize or deny access to the encrypted second segment based, at least in part, on the user identifier, the hash, the file identifier, and the file access permission data of the first segment;

receiving an access reply from the file access server, the access reply indicating whether access to the encrypted second segment including the requested designated action is authorized and including key information for decrypting the encrypted second segment only if the file access server has authorized access, the key information including a second decryption key for decrypting the encrypted second segment or information enabling a second computing device to generate or access the second decryption key;

if access to the encrypted second segment is authorized, receiving a latest version of the file at the computing device if the access query did not request the latest version of the file by way of the file access server enforcing versioning control by checking a version of the file stored at a remote data store identified by the access query based on the save data and the hash and by checking the version against a latest version of the file stored at the remote data store to determine whether the access query requested the latest version of the file, and if the access query did not request the latest version of the file, then the file access server serving the latest version of the file to the computing device; and decrypting the encrypted second segment of the file or the latest version of the file using the second decryption key to enable access to the second segment of the file or to the latest version of the file in accordance with the requested designated action.

10. The method of claim 9, wherein the set of one or more designated actions includes one or more of an open action, a save action, a save as action, a copy action, a print action.

11. The method of claim 9, wherein the second decryption key for decrypting the second encrypted segment is generated at the computing device based, at least in part, on the key information received from the file access server.

12. The method of claim 9, wherein the second decryption key for decrypting the encrypted second segment is generated at the file access server.

13. The method of claim 8, wherein the second decryption key for decrypting the encrypted second segment is unique to the user identifier and/or to the file.

14. The method of claim 9, wherein the data storage device comprises the remote data store, and wherein saving the encrypted file to the data storage device comprises transmitting the encrypted file to the remote data store.

15. A computing system, comprising:
a first computing device including a processor and a data storage device having a first instruction set stored thereon executable by the processor to:
generate a file including a first segment and a second segment, the first segment including or indicating file access permission data, a save date for the file, a file identifier, and a hash of at least a portion of the file,
encrypt the file to obtain an encrypted first segment from the first segment and an encrypted second segment from the second segment, the encrypted first segment having a different decryption key than the encrypted second segment; and
a second computing device including another processor and another data storage device having a second instruction set stored thereon executable by the another processor to:
obtain the encrypted file,
in response to a request to access the encrypted file, send an access query indicating a requested designated action to be performed on the file and including the encrypted first segment of the encrypted file and a user identifier for a user of the second computing device to a file access server via a communication network, the hash for use by the file access server to determine integrity of the access query, and the access query enabling the file access server, after decryption of the encrypted first segment with a first decryption key, to authorize or deny access to the encrypted second segment based, at least in part, on the user identifier, the hash, the file identifier, and the file access permission data of the encrypted first segment, the file access permission data indicating whether a user indicated by the user identifier may perform each designated action of a set of one or more designated actions, including the requested designated action, on the file,
receive an access reply from the file access server, the access reply indicating whether access to the encrypted second segment including the requested designated action is authorized and including key information for decrypting the encrypted second segment only if the file access server has authorized access, the key information including a second decryption key for decrypting the encrypted second segment or information enabling the second computing device to access or generate the second decryption key,
if access to the encrypted second segment is authorized, receiving a latest version of the file at the second computing device if the access query did not request the latest version of the file by way of the file access server enforcing versioning control by checking a version of the file stored at a remote data store identified by the access query based on the save date and the hash and by checking the version against a latest version of the file stored at the remote data store to determine whether the access query requested the latest version of the file, and if the access query did not request the latest version of the file, then the file access server serving the latest version of the file to the second computing device; and
decrypt the encrypted second segment of the file or the latest version of the file using the second decryption key to enable access to the second segment of the file or the latest version of the file in accordance with the requested designated action.

* * * * *